（12）United States Patent
Bantz et al.

(10) Patent No.: US 8,812,405 B2
(45) Date of Patent: Aug. 19, 2014

(54) SERVICES FOR SPONTANEOUS COLLABORATION

(75) Inventors: David Frederick Bantz, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/544,124

(22) Filed: Aug. 19, 2009

(65) Prior Publication Data

US 2010/0049581 A1 Feb. 25, 2010

Related U.S. Application Data (62) Division of application No. 11/031,590, filed on Jan. 7, 2005, now Pat. No. 7,882,043.

(51) Int. Cl.
*G06Q 10/00* (2012.01)
(52) U.S. Cl.
USPC .......................................... 705/319; 705/300
(58) Field of Classification Search
CPC .............................. G06Q 10/101; G06Q 50/01
USPC ....................... 705/1, 1.1, 300–301, 348, 319
See application file for complete search history.

(56) References Cited

U.S. PATENT DOCUMENTS

| | | | |
|---|---|---|---|
| 6,173,053 B1* | 1/2001 | Bogart et al. | 379/266.01 |
| 6,950,801 B2* | 9/2005 | Brookes et al. | 705/7 |
| 7,047,212 B1* | 5/2006 | Pych et al. | 705/26 |
| 7,082,407 B1* | 7/2006 | Bezos et al. | 705/26 |
| 7,162,436 B1* | 1/2007 | Eckel, Jr. | 705/14.67 |
| 2002/0198882 A1* | 12/2002 | Linden et al. | 707/10 |
| 2004/0044635 A1* | 3/2004 | Gordon et al. | 706/50 |
| 2004/0093323 A1* | 5/2004 | Bluhm et al. | 707/3 |
| 2004/0236853 A1* | 11/2004 | Jacobs et al. | 709/226 |
| 2005/0027612 A1* | 2/2005 | Walker et al. | 705/26 |
| 2005/0040230 A1* | 2/2005 | Swartz et al. | 235/383 |
| 2005/0043986 A1* | 2/2005 | McConnell et al. | 705/11 |

\* cited by examiner

*Primary Examiner* — Candice D Wilson
(74) *Attorney, Agent, or Firm* — Michael J. Buchenhorner; Vazken Alexanian (57) ABSTRACT

An apparatus for providing spontaneous collaboration between a shopper and consultants concerning a shopping goal derives information about the shopper's physical or logical proximity to a particular product category, combined with the current contents of his or her shopping cart is used to determine one or more shopping goals; as well as information about each potential consultant, including physical proximity, willingness to consult, areas of expertise and recent experience is used to rank each consultant in terms of relevance to one or more shopping goal.

15 Claims, 10 Drawing Sheets

| Shopping goal | Available consultants |
|---|---|
| electrical outlet | **Arthur M (in-store)<br>*Anne K (online) |
| glue | *William C (in-store) |

FIG. 8A

| Arthur M is at the front of aisle 7. | Page |
|---|---|

SERVICES FOR SPONTANEOUS COLLABORATION

CROSS-REFERENCE TO RELATED APPLICATIONS

This application is a division of, and claims priority from, U.S. patent application Ser. No. 11/031,590, filed on Jan. 7, 2005; which application is incorporated by reference in its entirety as if fully set forth herein.

FIELD OF THE INVENTION

The present invention generally relates to servicing and/or providing for establishing collaboration, and, more specifically, to establishing collaboration between shoppers for information, products and services. In some cases the collaboration is coordinated by a service bureau.

BACKGROUND

The retail shopping experience at the turn of the twentieth century was very different from that of today. The range of options presented by the typical retail establishment was very limited; store personnel were typically very knowledgeable about the products in the store, especially their areas of expertise. Stores were small and easily comprehended. Often, conversations could be struck up between shoppers so that experience could be shared.

Today, the in-person retail experience is often of an overwhelming range of choices and with few store personnel of limited knowledge of stocked products. Although spontaneous consulting with other shoppers does happen it is difficult to find other shoppers with relevant experience because of the great variety of goals represented by the shoppers of an enormous store. Increasingly, shoppers shop online, where the range of alternatives is even greater and the ability to consult with other shoppers or store personnel is virtually nonexistent.

SUMMARY OF THE INVENTION

The present invention addresses the above-mentioned inadequacies of the conventional in-store and online retail experience by automatically identifying consultants whose expertise is likely to be relevant to the shopper's needs. The invention facilitates the interaction between the shopper and consultants as well. Identification of potential consultants is based on physical proximity (in the case of the in-store experience), willingness to consult, currency and specificity of experience and records of successful consultancy in the past. The invention helps create a spontaneous collaboration between shoppers and consultants to increase the probability of a successful, satisfying shopping experience. Such an experience benefits the shopper, whose choices will be made more quickly and will be more applicable to his or her needs. The experience benefits the consultant, in that interactions with shoppers are more likely to be within the consultant's areas of expertise. The experience also benefits the retailer, because of the lessened probability of expensive returns, greater sales potential through reduced shopper uncertainty, and greater probability that the shopper will return.

It is to be noted that the present invention is not limited to retail shopping, but may be applied, in altered but obvious form, to any form of the acquisition of goods or services in which collaboration with a consultant is desired.

Thus, one aspect of the invention is a method for automatically determining the shopper's goals. The method includes a locating operation to determine the shopper's location in the store, or the shopper's current point of attention in an online store. The method further comprises a categorization operation in which the shopper's location is correlated with a map of the store or online store so as to identify the category of products the shopper is currently proximate to. Additionally, the current contents of the shopper's shopping cart are analyzed and compared to the proximate products so as to determine a characterization of the shopper's current goal. Additional qualifiers may participate in this characterization; such as the length of time the shopper has been proximate to a product category and whether the shopper has explicitly asked for help in making a choice. The shopper may also select from a prioritized list of automatically determined goals.

Another aspect of the invention is a method for the characterization of the areas of consultant expertise of consultants. This characterization can be based on how recently a consultant purchased products of a given category, how often he or she purchased such products, and whether the consultant advice given has been found by shoppers to be relevant and helpful. The method also consists of a determination of the willingness and capability of each consultant to give advice, based on physical proximity, current workload and explicitly stated desire.

The combination of the above-mentioned methods is found sufficient to discover whether the necessary and sufficient conditions for a successful consultancy are met. The invention concerns both methods for such discovery and services to provide such discovery.

Various steps and/or functions of the collaboration in the present invention are often coordinated by a service bureau. The foregoing and other features, utilities and advantages of the invention will be apparent from the following more particular description of various embodiments of the invention as illustrated in the accompanying drawings.

BRIEF DESCRIPTION OF THE DRAWINGS

The above and other objects, features, and advantages of the present invention will become more apparent from the following detailed description when taken in conjunction with the accompanying drawings, in which.

DEFINITIONS shopping cart—the term "shopping cart" refers to a part of the context in which collaboration is desired, that part having to do with identifiable resources that have been recently acquired by the shopper. The context also includes historical data pertaining to the current task on which collaboration is desired, products and services that are relevant to this task by reason of being physically or logically proximate to the shopper, any information pertinent to the current task, such as a shopping list, and other appropriate information.

consultant's shopping cart:—this term refers to a part of the context of a given consultant, that part having to do with identifiable resources that have been recently acquired by the consultant.

shopping experience—the purpose of shopping is to procure products, services or information most appropriate to a given task at the lowest cost. "Appropriate," in this context, means accuracy, relevance, reliability and other such attributes.

suitable consultant to collaborate with—a consultant is suitable to collaborate with if collaboration with that consultant is likely to supply information enabling a better shopping experience. shopper [for information, goods etc.]—a shopper is an entity (a person or system) seeking to acquire products, services or information. The purpose of acquiring these products, services or information is to further one or more goals of the shopper.

consultant—a consultant is an entity (a person or system) from which information can be obtained through collaboration.

collaboration—the act of collaboration consists of an exchange of information between a shopper and a consultant, such that that exchange increases the probability of the shopper obtaining information enabling a better shopping experience. Collaboration generally requires a positive coincidence of interest between the shopper and the consultant.

coincidence of interest—a shopper and a consultant have coincidence of interest if the consultant has knowledge about the candidate products or information that the shopper is considering to acquire, or knowledge about the goals for which the shopper is considering the acquisition of products or information. This knowledge may be used to enhance the shopping experience, in which case the coincidence of interest is referred to as "positive," or it may be used for other purposes. One such purpose is to thwart the shopper, because the consultant may be a shopper as well, whose purpose is to obtain information and products exclusively. If this is the case, the coincidence of interest is referred to as "negative."

DETAILED DESCRIPTION OF THE INVENTION

The present invention provides systems, apparatus and methods for in-store and online retail experience by automatically identifying consultants whose expertise is likely to be relevant to a shopper's needs. The invention facilitates the interaction between the shopper and consultants as well. Identification of potential consultants is based on physical proximity (in the case of the in-store experience), willingness to consult, currency and specificity of experience and records of successful consultancy in the past. The invention helps create a spontaneous collaboration between shoppers and consultants to increase the probability of a successful, satisfying shopping experience. Such an experience benefits the shopper, whose choices will be made more quickly and will be more applicable to his or her needs. The experience benefits the consultant, in that interactions with shoppers are more likely to be within the consultant's areas of expertise. The experience also benefits the retailer, because of the lessened probability of expensive returns, greater sales potential through reduced shopper uncertainty, and greater probability that the shopper will return.

In an example embodiment, the present invention includes a method for automatically determining the shopper's goals. The method includes a locating operation to determine the shopper's location in the store, or the shopper's current point of attention in an online store. The method further comprises a categorization operation in which the shopper's location is correlated with a map of the store or online store so as to identify the category of products the shopper is currently proximate to. Additionally, the current contents of the shopper's shopping cart are analyzed and compared to the proximate products so as to determine a characterization of the shopper's current goal. Additional qualifiers may participate in this characterization; such as the length of time the shopper has been proximate to a product category and whether the shopper has explicitly asked for help in making a choice. The shopper may also select from a prioritized list of automatically determined goals.

In another embodiment, the invention provides a method for the characterization of the areas of consultant expertise of consultants. This characterization can be based on how recently a consultant purchased products of a given category, how often he or she purchased such products, and whether the consultant advice given has been found by shoppers to be relevant and helpful. The method also consists of a determination of the willingness and capability of each consultant to give advice, based on physical proximity, current workload and explicitly stated desire.

The combination of the above-mentioned methods is found sufficient to discover whether the necessary and sufficient conditions for a successful consultancy are met. The invention concerns both methods for such discovery and services to provide such discovery.

The foregoing and other features, utilities and advantages of the invention will be apparent from the following more particular description of various embodiments of the invention as illustrated in the accompanying drawings.

Figure 1:
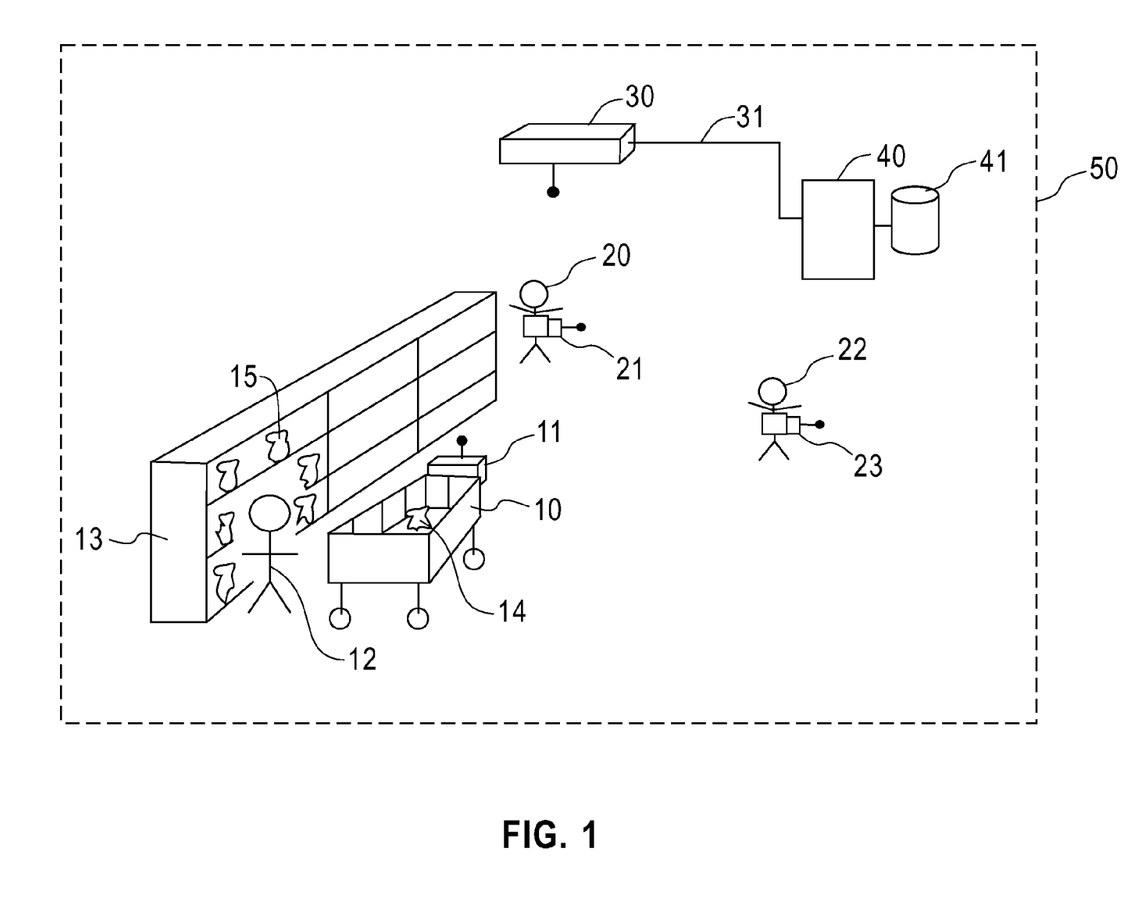
FIG. 1 shows an exemplary environment embodying the present invention for an in-store shopping experience.

FIG. 1 shows an exemplary environment 50 embodying the present invention. It is initially noted that the environment 50 is presented for illustration purposes only, and is representative of countless configurations in which the invention may be implemented. Thus, the present invention should not be construed as limited to the environment configurations shown and discussed herein.

In one configuration of the invention, the environment 50 includes a shopper 12, a shopping cart 10, shelves 13 containing items 15 and potential collaborators 20 and 22. Potential collaborators 20 and 22 are equipped with devices 21 and 23 that, in conjunction with in-store device 30 locate the position of collaborators 20 and 23 within the store. In-store device 30 transmits the location of collaborators 20 and 22 via in-store communication means 31 to a server computer 40, to which is connected persistent storage means 41. Server computer 40 and storage means 41 need not be physically located within the store. Shopping cart 10 is also equipped with device 11, which, in conjunction with in-store device 30 locates the shopping cart 10 within the store. In-store device 30 transmits the location of shopping cart 10 via in-store communication means 31 to a server computer 40. Shopping cart 10 is also equipped to sense its contents 14 and, via device 11, to transmit data identifying its contents 14 to server computer 40 via in-store device 30 and in-store communication means 31.

By means of the components shown in FIG. 1, software in server computer 40 can determine an approximation to the shopping goal of shopper 12, as will be shown. Software running in server computer 40 can determine the current location of potential collaborators 20 and 22 and stores profiles of the expertise and experience of potential collaborators 20 and 22, as well as the physical location of shopping cart 10. It is assumed that the physical location of shopper 12 is close to that of shopping cart 10, although if this assumption is not found to be correct in a given area of application of the invention the shopper may be equipped with a wearable means of position determination. Software running in server computer 40 can then identify which, if any, potential collaborators 20 and 22 are both proximate to shopping cart 10 and have current expertise and experience relevant to the shopping goal of shopper 12.

Figure 2:
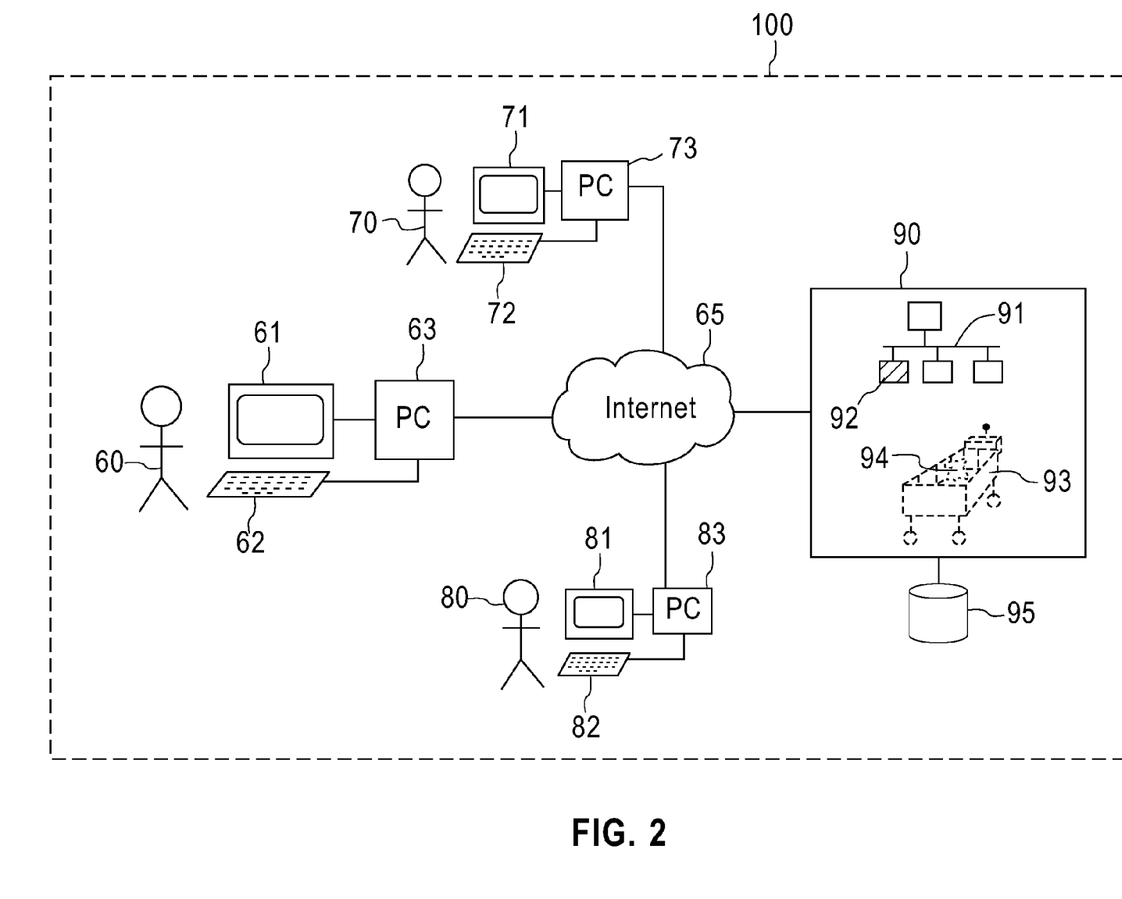
FIG. 2 shows an exemplary environment embodying the present invention for an online shopping experience.

In another configuration of the invention, shown in FIG. 2, the environment 100 consists of shopper 60 using PC 63, potential shopping collaborators 70 and 80, using PCs 73 and 83, respectively, PCs 63, 73 and 83 connected to the Internet 65. Also connected to the Internet 65 is server computer 90 with persistent storage 95. Software running in server computer 90 maintains a web of pages 91 and the identification of one page in that web 92 which is the object of the current attention of shopper 60. This software also maintains a representation of a virtual shopping cart 93 with current contents 94. This software also maintains a list of potential shopping collaborators 70 and 80. These potential shopping collaborators 70 and 80 use means similar to that of shopper 60 to access the Internet 65, namely PCs 73 and 83. These PCs and that of shopper 60 are equipped with visual display devices 71, 81 and 61, respectively, and with interactive devices 72, 82 and 62, respectively.

Software in server computer 90 through its knowledge of the web page 92 that is the object of current attention of shopper 60, and through its knowledge of the current contents 94 of virtual shopping cart 93, can form an approximation of the shopping goal of shopper 60. Software in server computer 90 can similarly evaluate the expertise and experience of potential shopping collaborators 70 and 80, by accessing records of expertise and recent experience from storage device 95. Finally, software in server computer 90 can evaluate whether each of the potential shopping collaborators 70 and 80 are currently online. This permits the software to determine which, if any, of the potential shopping collaborators 70 and 80 is likely to be able to collaborate with shopper 60 in furtherance of the shopper's goal.

Figure 3:
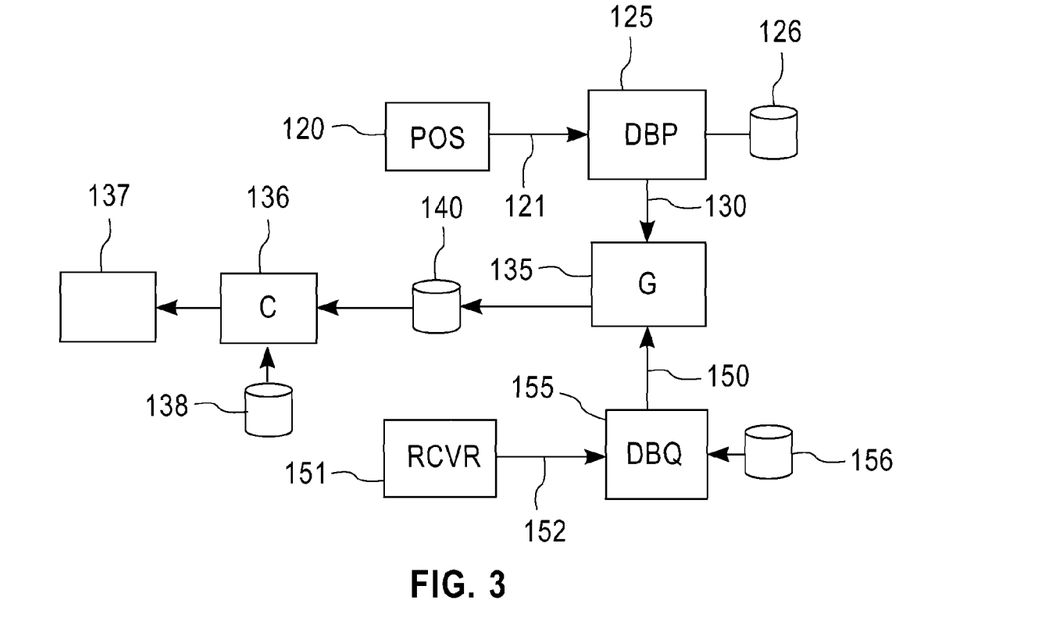
FIG. 3 shows the elements of the invention required to determine a potential consultant.

FIG. 3 depicts the components of the invention required to determine a potential consultant. The shopping goal will be created in persistent storage device 140 by software 135 running in server computer 40 of FIG. 1. This software 135 is identified in FIG. 3 as a box labeled G. The software 135 receives two inputs 130 and 150 representing, respectively, the product set to which the shopper is currently proximate, and the product sets represented in the current contents of the shopper's cart. A product set represents a classification of products into groups for purposes of abstracting the shopper's goal. For example, a specific product may be Irish Spring Aloe soap; the product set to which the product belongs may be soap for human cleaning. The classification of products into product sets is beyond the scope of this invention, although it is important in determining the shopper's goal.

Position-determining means 120 reports the shopper's current position 121 to database software 125. The database itself resides in persistent storage device 126. Database software 125, represented in FIG. 3 as a box labeled DBP, may run in server computer 40 of FIG. 1, with persistent storage device 126 attached to that server computer, although other configurations of the system in which database software 125 and persistent storage device 126 are in separate computers are feasible and practical. Database software 125 reports a list of product sets 130.

Receiver 151 receives a list of the current contents of the shopper's cart 10 of FIG. 1 by means not shown in FIG. 3. This list 152 is used to interrogate database software 155. Database software 155, represented in FIG. 3 as a box labeled DBQ, may run in server computer 40 of FIG. 1, with persistent storage device 156 attached to that server computer, although other configurations of the system in which database software 155 and persistent storage device 156 are in separate computers are feasible and practical. Database software 155 reports a list of product sets 150.

Once a list of shopping goals has been stored on persistent storage device 140, software 136 uses those goals, together with a database of potential consultants stored on persistent storage device 138, to determine a rank-ordered list of potential consultants. This list is then transmitted to shopping cart 10 of FIG. 1 via communication means 137.

It is to be noted that FIG. 3 can be interpreted to apply to both the in-store and online shopping experiences. Position determining means 120 in the in-store case determines the geographic position of the shopper in the store, while in the online case position determining means 120 determines the logical position of the web page that is the current object of the shopper's attention in the map of web pages for the site. Similarly, receiving means 151 in the in-store case determines the current contents of the shopper's physical cart, while in the online case receiving means 151 determines the current contents of the shopper's virtual cart. The description here continues specific to the in-store case, but is equally applicable to the online case with the appropriate interpretation.

Figure 4A:
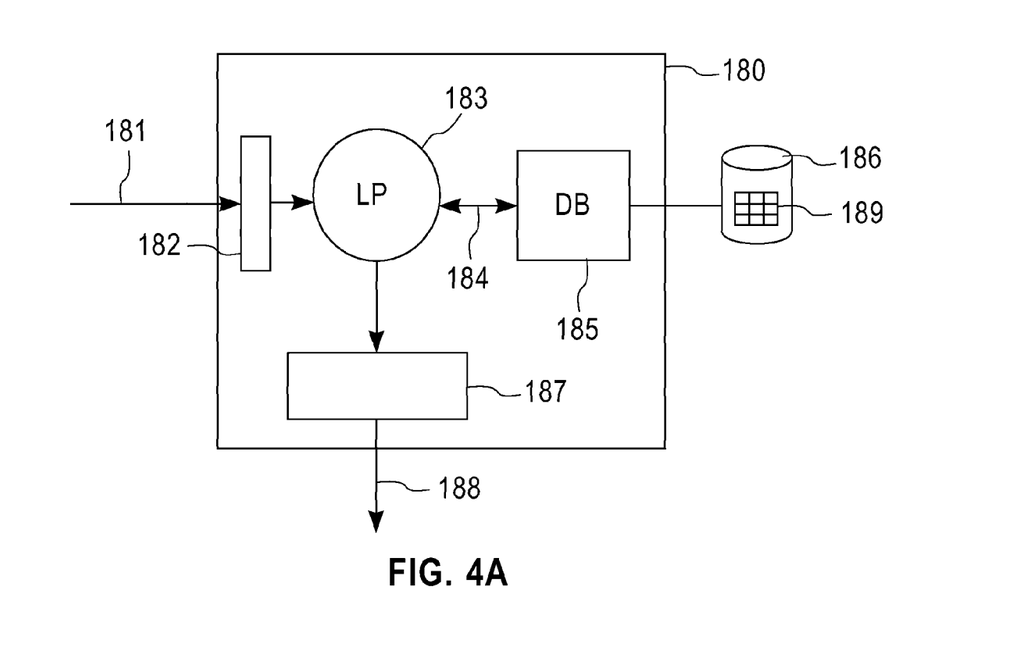
FIGS. 4A and 4B show the elements of the invention required to determine the product sets to which the shopper is currently proximate, and a flowchart of the process.

FIG. 4A illustrates system components and their interconnection to determine the product set or sets to which the shopper is currently proximate. Location information 181 is received by receiving software 182 through means not shown. Examples of such means are computer-based digital networks such as local area networks or the Internet. Location information is typically specified in terms of geographic latitude, longitude and altitude or in x, y and z coordinates relative to a designated point within a store. Location information 181 is input to software process 183, which will use this information to determine the product sets to which the shopper is currently proximate, as will be described subsequently. Software process 183 issues database inquiries 184 to database software 185. These inquiries can be expressed in one of many forms, for example in the SQL language, documented in "An Introduction to Database Systems, Volume I," fifth edition, by C. J. Date, published by the Addison-Wesley Publishing Company, Reading, Mass., ISBN 0-201-51381-1. The database used by database software 185 resides on persistent storage device 186. This database is preferably implemented as a relational database, described in the book by Date. One of the tables in this database 189 lists all of the products sold in the store. For each product, the table 189, called the Master Location Table, gives its product set and the geographic coordinates of its location in the store. If a product is offered for sale in more than one location in the store the product may be represented by a separate table for that product alone, and the Master Location Table 189 makes reference to that table rather than storing the product information directly.

Figure 4B:
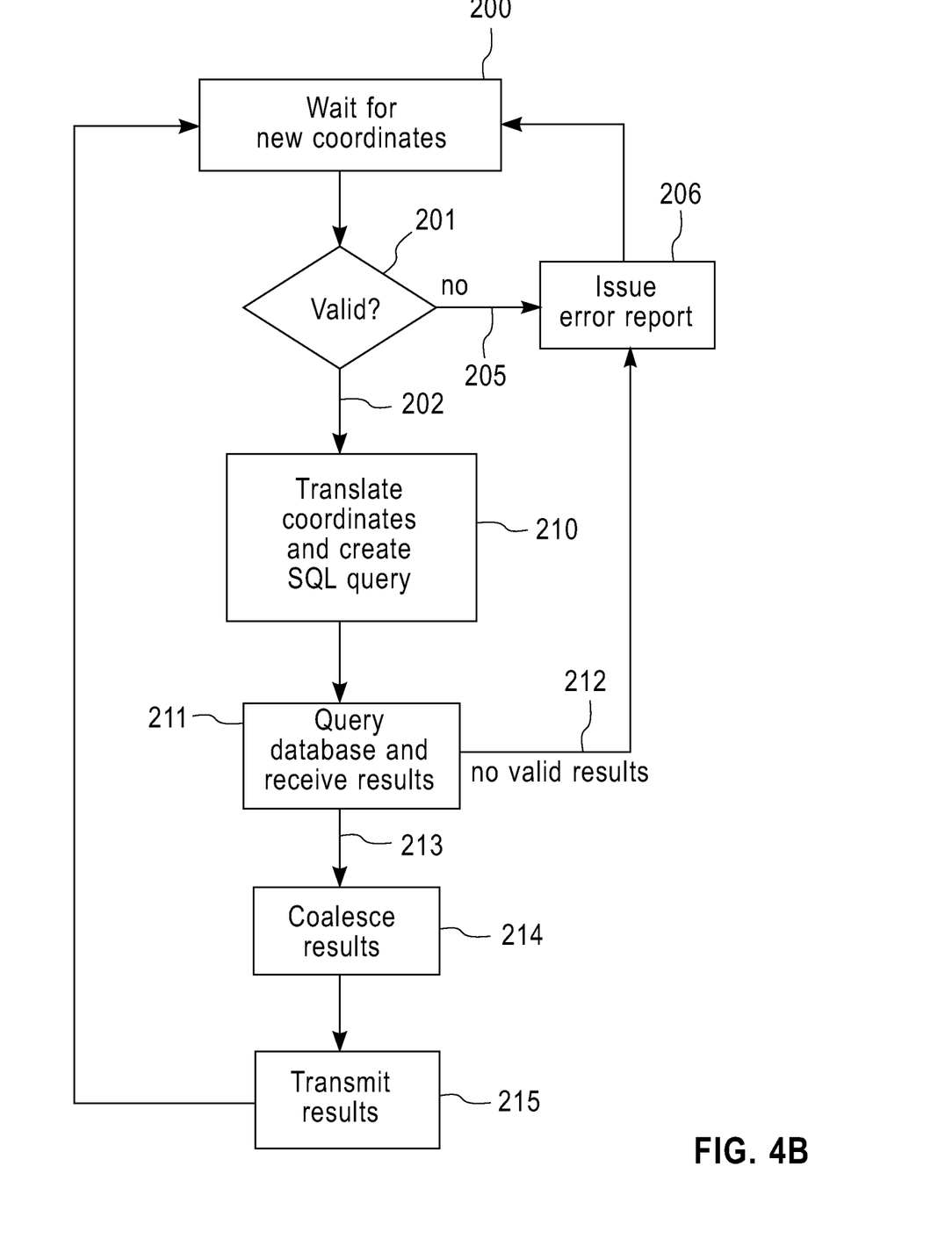

In operation, process 183 makes inquiry to database software 185 and receives in response a list of product sets. That list 188 is transmitted via communication software 187 to software 135 of FIG. 3. FIG. 4B gives a flowchart for process 183 of FIG. 4A. The process begins in block 200 where the process waits for the arrival of new coordinates. Coordinates can be supplied periodically or only if the shopper's position changes by an amount deemed significant. Decision block 201 checks the coordinates for validity, for example if latitude, longitude and altitude lie within the known boundaries of the store, and if they do not, branch 205 is taken to block 206, where an error report is issued. Block 200 is then entered to wait for the next set of coordinates.

If the coordinates are found valid by decision block 201, branch 202 is taken to block 210. Block 210 translates the coordinates, if necessary. This translation is necessary if the coordinates in the Master Location Table 189 of FIG. 4A are relative to a point in the store, while coordinates input to the process 183 of that figure are in absolute geographic coordinates. Block 210 then creates a query using, for example, the SQL query language, and in block 211 the query is issued to the database. Block 211 waits for results from the database and when they arrive, checks to see if there are substantive results. There may be no results because the store is not selling any products at the given location. This is a valid response because, for example, the shopper may be in the store's office. There may be no results because the given location is not a valid location in the store; for example, the given coordinates may correspond to the store's boiler room. In the latter case, branch 212 is taken to block 206, wherein an error report is issued and block 200 subsequently entered.

If valid results are received from the database, branch 213 is taken to block 214, where multiple results are coalesced if appropriate. As an example, the presence of a given product set may have been reported by the database multiple times. Although this may be suppressed through a certain formulation of the SQL query, if it has not been suppressed then block 214 can eliminate unnecessary duplication. After block 214 completes, the results, consisting of a list of all of the product sets available in the given locality, are transmitted by block 215. Subsequently, block 200 is entered to wait for the next set of coordinates.

Figure 5A:
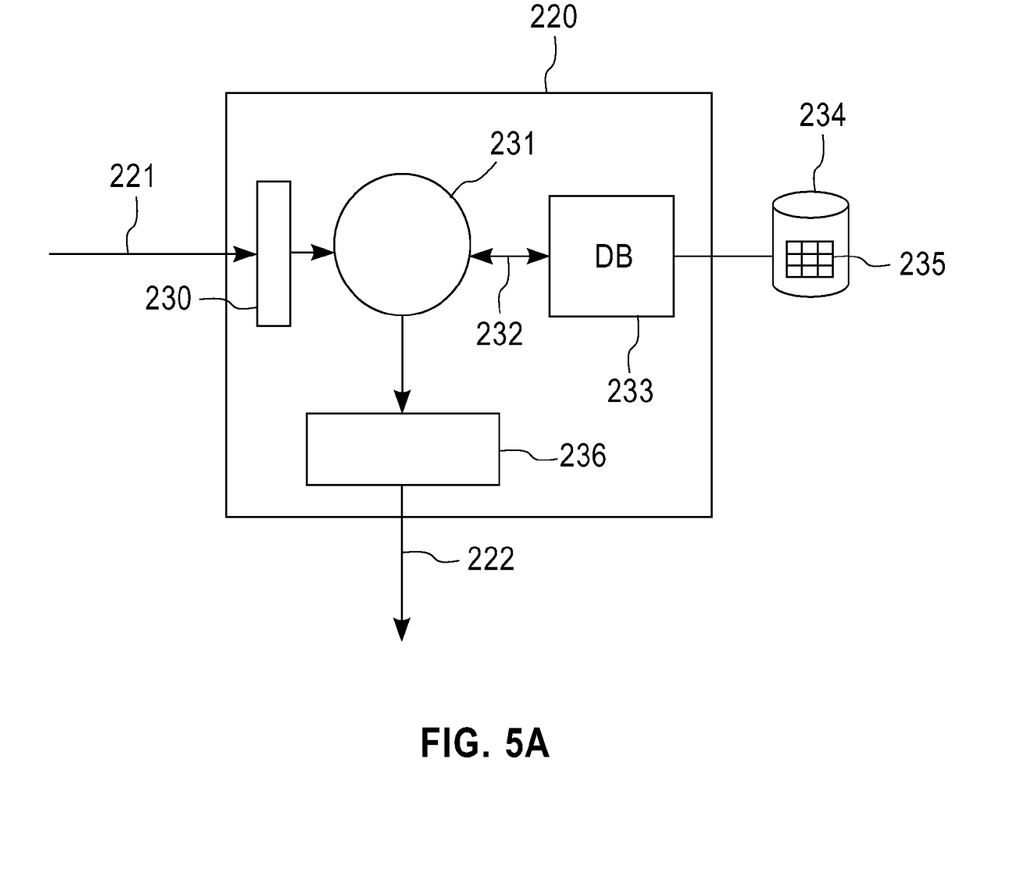
FIGS. 5A and 5B show the elements of the invention required to determine the product sets represented in the current contents of the shopper's shopping cart, and a flowchart of the process.

FIG. 5A illustrates system components and their interconnection to determine the product set or sets from the shopping cart contents. Cart content information 221 is received by receiving software 230 through means not shown. Examples of such means are wireless computer-based digital networks such as wireless local area networks. Cart content information is typically specified in terms of stock control numbers, or SKUs. Cart content information 221 is input to software process 231, which will use this information to determine the product sets represented by the current contents of the shopping cart. Software process 231 issues database inquiries 232 to database software 233. These inquiries can be expressed in one of many forms, for example in the SQL language, as previously noted. The database used by database software 232 resides on persistent storage device 234. This database is preferably implemented as a relational database, described in the book by Date. One of the tables in this database 235 lists all of the products sold in the store. For each product, the table 235, called the Master Product Table, gives its SKU and its product set. If a product is in more than one product set the product may be represented by a separate table for that product alone, and the Master Product Table 235 makes reference to that table rather than storing the product information directly.

Figure 5B:
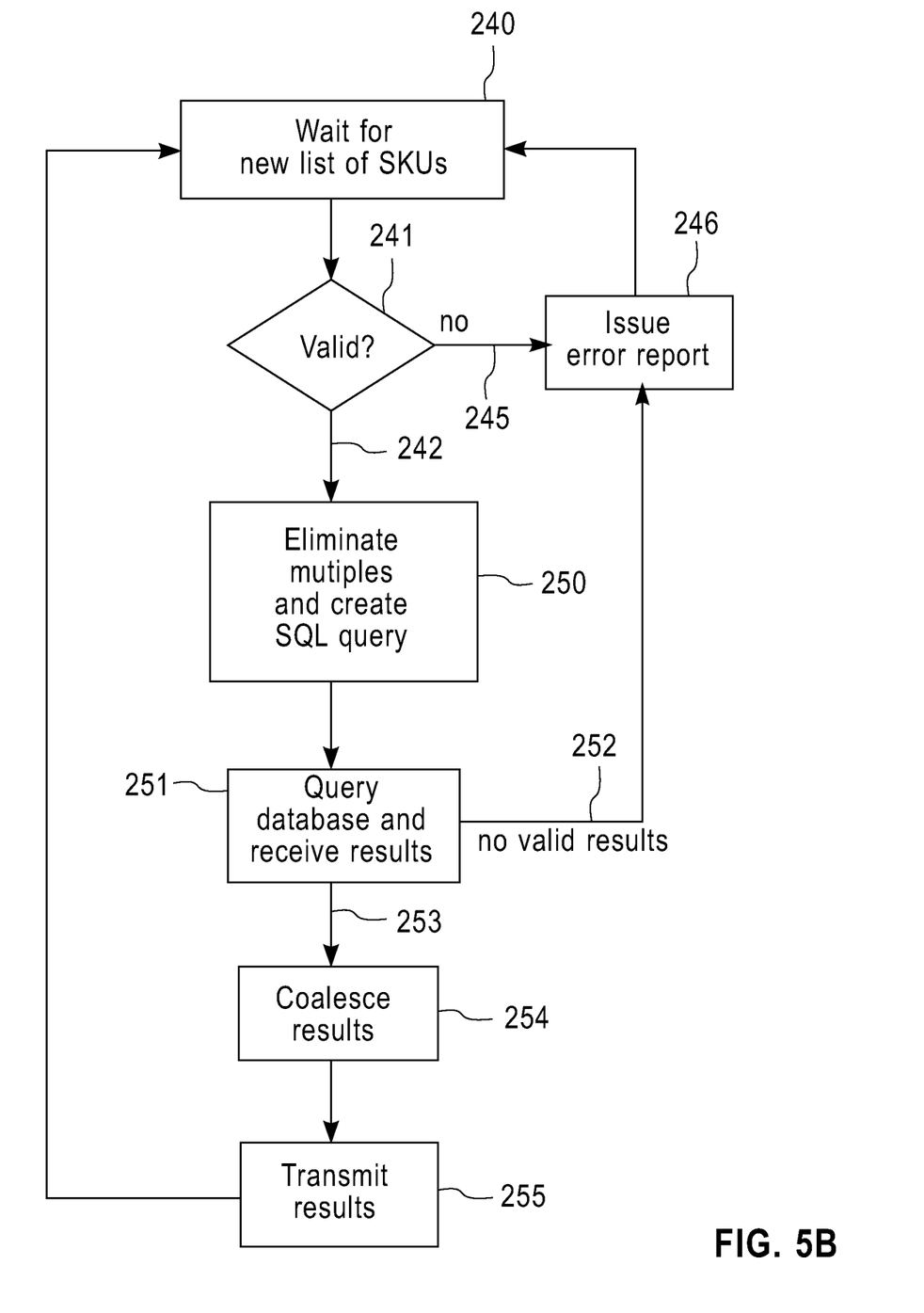

In operation, process 231 makes inquiry to database software 233 and receives in response a list of product sets. That list is transmitted via communication software 236 to software 135 of FIG. 3. FIG. 5B gives a flowchart for process 231 of FIG. 5A. The process begins in block 240 where the process waits for the arrival of new SKUs. SKUs can be supplied periodically or only if the shopper's cart contents change by an amount deemed significant. Decision block 241 checks the SKUs for validity, and if they are not valid, branch 245 is taken to block 246, where an error report is issued. Block 240 is then entered to wait for the next set of SKUs.

If the SKUs are found valid by decision block 241, branch 242 is taken to block 250. Block 250 eliminates multiples; for example, if the shopper has placed more than one unit of a product in the shopping cart. Block 250 then creates a query using, for example, the SQL query language, and in block 251 the query is issued to the database. Block 251 waits for results from the database and when they arrive, checks to see if there are valid results. There may be no valid results because the store may not be selling any products with the given SKU. This may be, for example, because the shopper may have picked up an item that has just been withdrawn from sale. In the latter case, branch 252 is taken to block 246, wherein an error report is issued and block 240 subsequently entered.

If valid results are received from the database, branch 253 is taken to block 254, where multiple results are coalesced if appropriate. As an example, the presence of a given product set may have been reported by the database multiple times. Although this may be suppressed through a certain formulation of the SQL query, if it has not been suppressed then block 254 can eliminate unnecessary duplication. After block 254 completes, the results, consisting of a list of all of the product sets represented by the current contents of the shopping cart, are transmitted by block 255. Subsequently, block 240 is entered to wait for the next set of SKUs.

Figure 6:
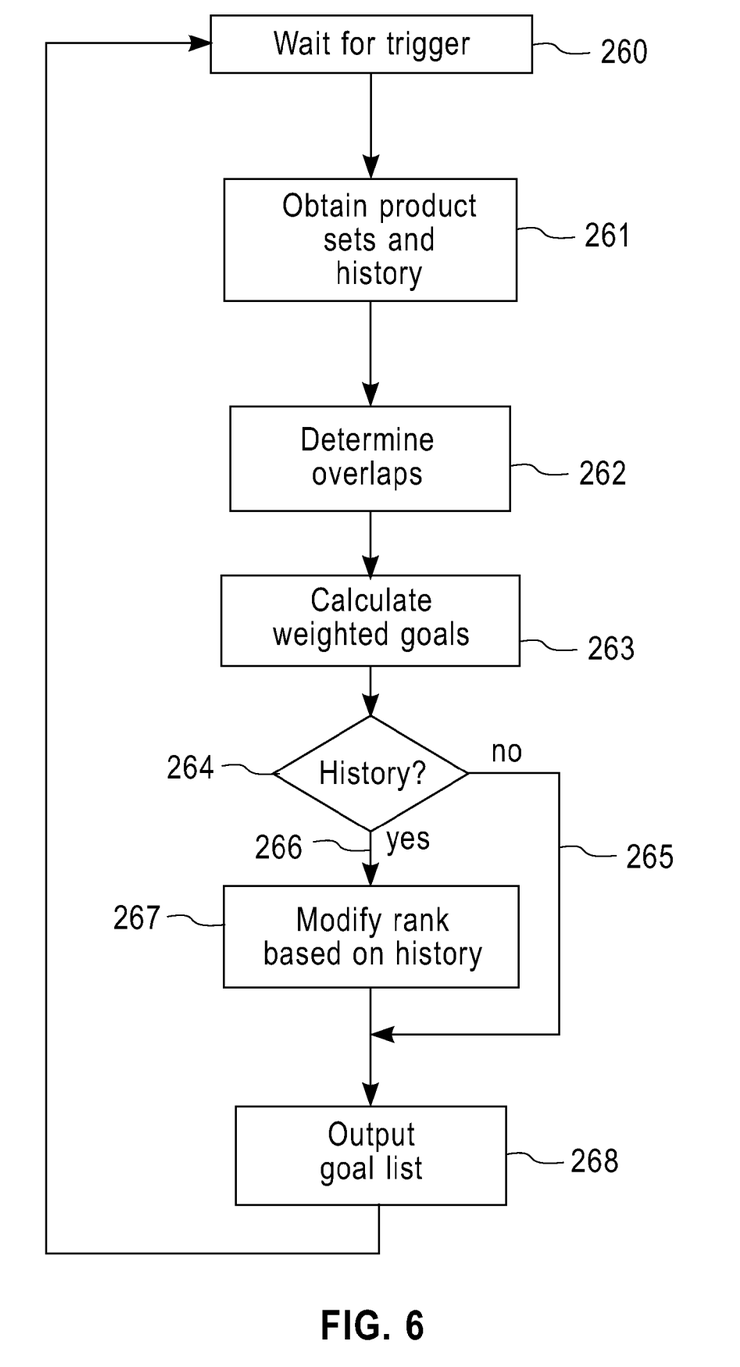
FIG. 6 shows a flowchart of the analysis procedure by which the shopping goal is determined.

FIG. 6 concerns the processing performed by process 135 of FIG. 3. Processing begins when block 260 detects a trigger. This trigger can be created by a timer, which creates the trigger periodically, or by an alteration in the contents of the shopping cart, either by an addition to or a removal of a product. The trigger can also be created by a change in the location of the shopping cart. Combinations of the above elements can also be used to create the trigger; for example, a trigger can be created periodically and also if one or more of the events above occur.

When the trigger is detected in block 260, block 261 is entered in which product sets are obtained, as previously described. In addition, any historical information known about the shopper is obtained in this block by means not shown. Block 262 then determines overlaps between the various product sets. For example, if the shopper is proximate to product sets A and B, and if product set B is represented by the current contents of the shopping cart, product set B is deemed to be a potential shopping goal. Block 263, which is optional, can create a weighted list of potential shopping goals based on the number and extent of overlaps. For example, if there are multiple representatives of product set B currently in the shopping cart, product set B would be weighted higher on the list of potential shopping goals. Decision block 264 then checks to see if any history is known about the shopper. Typically, this history would be stored in a database that records past purchases, web-site activity and the like. If no such history is available branch 265 is taken to bypass block 267. If history is available, block 267 is entered to modify the weighting or ranking of the various potential shopping goals based on past behavior. For example, if it is known that the shopper has a history of past purchases of product set B, and if the shopper is proximate to products of product set B, and if the shopping cart currently contains one or more units of a product in product set B, then the weighting of product set B as a potential shopping goal would be significantly increased in block 267.

Block 268 then transmits the weighted or ranked list of potential shopping goals to persistent storage device 140 of FIG. 3. This list will be used subsequently in the selection of potential collaborators.

Figure 7A:
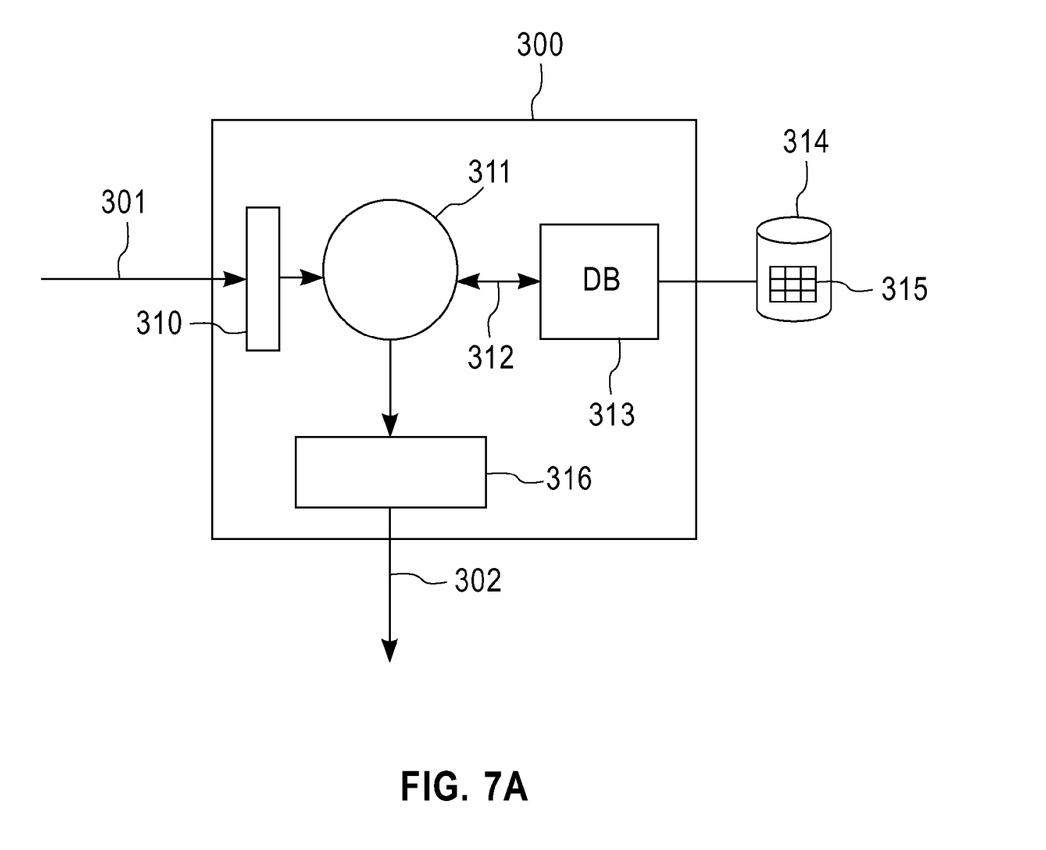
FIG. 7A shows the elements of the invention required to discover potential consultants relevant to the shopping goal.

FIG. 7A illustrates system components and their interconnection to discover a list of potential consultants from the list of shopping goals. Goal information 301 is received by receiving software 310 through means not shown. Examples of such means are inter-program communication and computer-based digital networks such as local area networks. Goal information is specified in terms of product sets. Goal information 301 is input to software process 311, which will use this information to determine which available consultants are the most likely to be able to aid the shopper. Software process 311 issues database inquiries 312 to database software 313. These inquiries can be expressed in one of many forms, for example in the SQL language, as previously noted. The database used by database software 313 resides on persistent storage device 314. This database is preferably implemented as a relational database, described in the book by Date. One of the tables in this database 315 lists all of the available consultants. For each consultant, the table 315, called the Master Consultant Table, gives its product set. If a consultant is experienced and knowledgeable in more than one product set the consultant may be represented by a separate table for that consultant alone, and the Master Consultant Table 315 makes reference to that table rather than storing the consultant information directly.

Figure 7B:
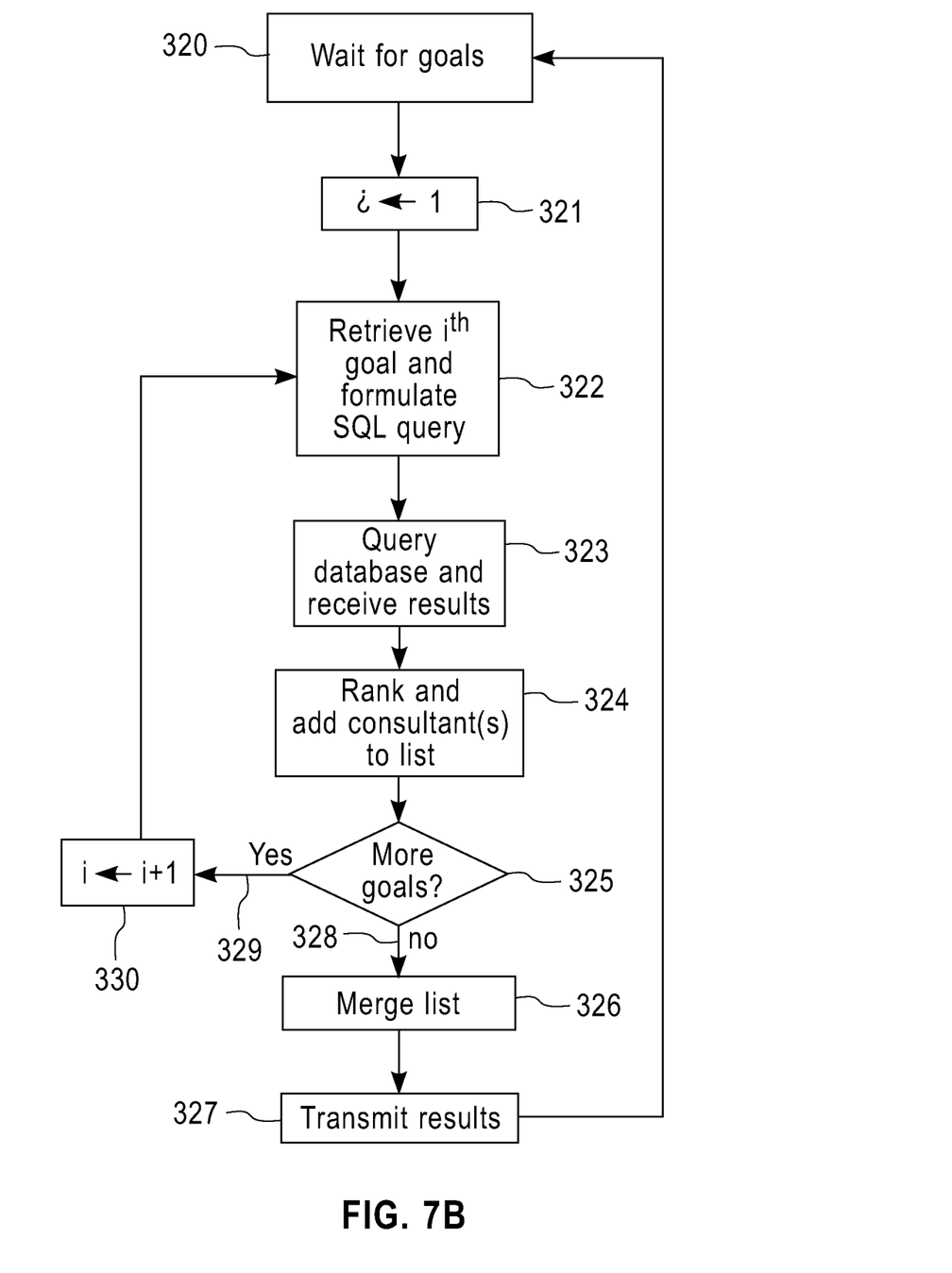
FIG. 7B shows a flowchart of the ranking procedure by which potential consultants are ranked in terms of their likely relevance to the shopper's goal.

In operation, process 311 makes inquiry to database software 313 and receives in response a list of potential consultants. That list is transmitted via communication software 316 to shopping cart 10 of FIG. 1. At that cart the shopper will review the list and may select a consultant from it. FIG. 7B gives a flowchart for process 311 of FIG. 7A. The process begins in block 320 where the process waits for the arrival of new goals. When new goals arrive, block 321 is entered to initialize an index i, which selects goals from the goal list. Block 322 then accesses the goal list to retrieve the i.sup.th goal, and uses the product set from that goal to formulate an SQL query to the Master Consultant Table 315 of FIG. 7A. In block 323 the database is queried and results of the query received. The results of the query are a list of consultants with experience and knowledge of the given product set. Block 324 ranks the consultants and adds them to a list that will subsequently be sent to shopping cart 10 of FIG. 1. Processing in block 324 will be subsequently detailed.

Once the consultants relevant to the current shopping goal have been determined and ranked, block 325 checks to see if there are any more goals, and if so, branch 329 is taken to block 330, where the index i is incremented. Processing then continues with block 322. If there are no more goals, branch 328 is taken to block 326, where the list of consultants is merged. That is, if one consultant is relevant to more than one shopping goal, duplicate appearances of that consultant are eliminated from the list. Finally, in block 327, the list is transmitted to shopping cart 10 of FIG. 1 for inspection and selection by the shopper.

The process performed in block 324 ranks the possibly multiple consultants found by database query. The criteria that can be used for this ranking are various. For example, physical proximity between the shopper and the consultant can be used, where closer physical proximity implies a higher ranking. Past experience with the consultant may be stored in the Master Consultant Table, such that better past experience implies a higher ranking. Consultants with broad experience with multiple product sets may be preferred over consultants with narrower experience, implying a higher ranking. Many means are known for determining a ranking from multiple criteria, and each may be useful in a particular case of use of the invention.

Figure 8A:
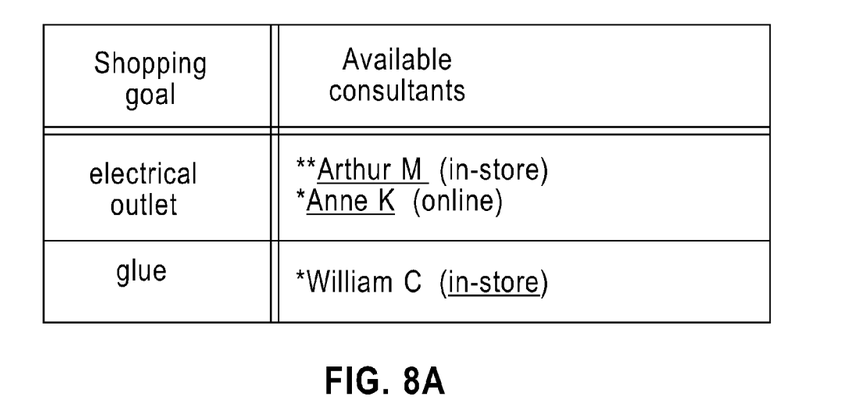
FIGS. 8A, 8B and 8C show user interfaces allowing the shopper to choose, communicate with and rate one or more consultants.

FIG. 8A shows a user interface typically displayed on a shopping cart for consultant selection. The interface consists of a table of two rows and two columns, the column headings being "shopping goal" and "available consultants." Each of the two rows is devoted to a single shopping goal. In the case of the topmost row, the shopping goal relates to an electrical outlet. Two potential consultants, Arthur M and Anne K, are shown, each with a rating. Arthur M is rated higher than Anne K both because he is presented topmost in the list of potential consultants and because his name is prefixed with two asterisks, indicating a high rating. For each potential consultant a qualifier is given after the consultant's name. Arthur M is shown to be present in the store at the time the user interface is shown to the shopper, while Anne K is available online. Arthur M's name is underlined, which is the convention for a clickable link.

Figure 8B:
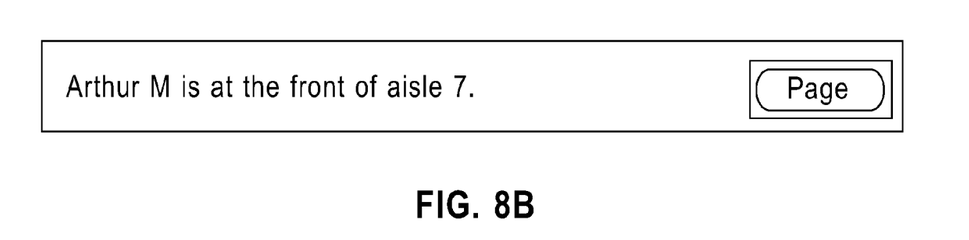

FIG. 8B results when the clickable link for Arthur M is selected by the shopper. The user interface gives Arthur M's current location in the store and gives the shopper a button to press to page him. At this point the shopper has the option of walking to the front of aisle 7 or, by paging, to ask Arthur M. to come to the shopper's current location.

Figure 8C:
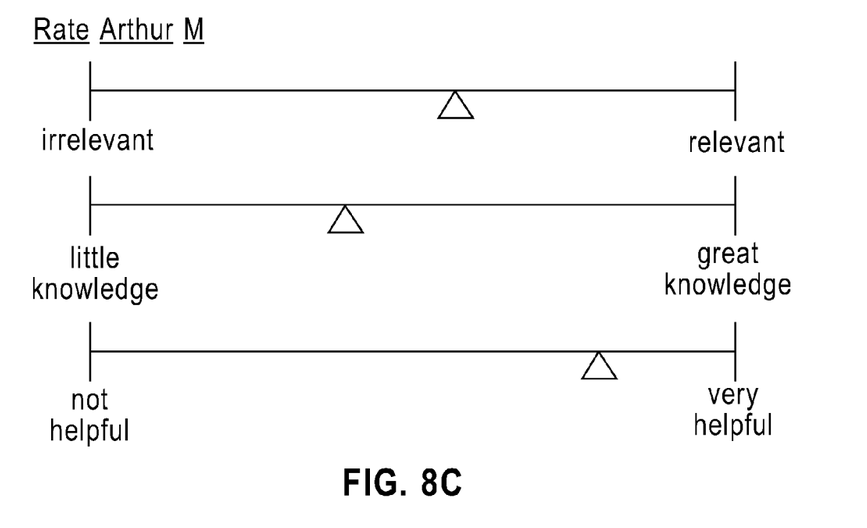

FIG. 8C is a user interface for the shopper to rate his or her interaction with Arthur M. The interface consists of three sliders. The shopper manipulates the triangle so as to indicate his or her impression of the relevance of Arthur M to their shopping goal, the degree of knowledge of Arthur M about the goal, and how helpful Arthur M was in helping the shopper with that goal.

The implementation of the user interfaces depicted in FIGS. 8A, 8B and 8C on the shopping cart is familiar to those skilled in the art, as are the means by which shopping goals, consultant names and ratings may be transmitted between the shopping cart and server computer 40 of FIG. 1. It may be convenient in one form of the invention for the server computer 40 to create images for display on shopping cart 10 rather than having software in shopping cart 10 interpret and create interactive displays. Many options exist for shopper interaction, including audio messages and speech recognition, as well as display-oriented interaction. Similarly, more complex negotiations for a consultant can be conducted in which consultants bid to help a shopper, or in which a consultant rejects a collaboration request for any of various reasons.

The foregoing description of the invention has been presented for purposes of illustration and description. It is not intended to be exhaustive or to limit the invention to the precise form disclosed, and other modifications and variations may be possible in light of the above teachings. It can be seen that the description given above provides a simple, but complete implementation of a system for facilitating collaboration during shopping. That is, embodiments have been presented allowing a shopper to receive an automatically generated list of potential collaborators to assist in shopping.

In an enhanced embodiment, product sets determined to represent shopping goals may be used to access a database of tasks. For example, if the current contents of the shopping cart includes an electrical outlet and electrical cable, representing a product set containing electrical wiring components, and additionally if the current contents of the shopping cart include a table lamp, representing a product set containing lighting components, a database may be constructed in which the presence of both an electrical wiring product set and a lighting product set is associated with the task of installing additional electrical lighting. Knowledge of the task that the shopper is about to perform permits an enhanced collaboration with potential collaborators.

The embodiments described herein enable many forms of collaboration with many kinds of collaborators. Collaborators can be employees of a store, other shoppers or other people physically present in or near the store. Collaborators can be people physically remote from the shopper, communicating with the shopper via various means including telephony, instant messaging, video-conferencing, e-mail or other means. Collaborators may also be computer-based agents, including databases and Web services. The purposes for the collaboration are various, including, but not limited to, assistance in the selection of products, identification of products inadvertently omitted, avoidance of products inappropriate to the task, avoidance of products that are known to be ineffective or dangerous, and selection of the most cost-effective products. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

There is said to exist a coincidence of interest when a common interest includes a point of interest taken from a group of points of interest consisting of: consultant's direct knowledge of the shopper's immediate goal; consultant's experience with said product, service or information; consultant's direct knowledge of said product, service or information; consultant's knowledge of correct product, service or information so as to minimize returns and rejection of said product, service or information; consultant's direct knowledge of justification of substitution of a different product, service or information; consultant's direct knowledge of ways to increase the likelihood of satisfactory completion of the shopping experience; ways of satisfying shopper's desire; ways to increasing the likelihood of additional transactions; and any combination of these and similar points of interest.

In some embodiments, the shopping collaboration is coordinated and/or run by a service bureau. The service bureau may be involved in one or more of the following: running the steps of collaboration; metering usage; and determining, setting and/or collecting fees based on usage and/or the number of connections made between shoppers; and so forth. Fees may be incurred by shoppers, stores and/or consultants.

The invention includes a method comprising locating a collaborator based on an automatic determination of likely coincidence of interests. The step of locating comprising: forming an estimate of a shopping interest of a shopper; estimating a consulting interest of at least one consultant; finding at least one common element between the shopping interest of the shopper and the consulting interest of said at least one consultant, said at least one common element forming a coincidence of interest; and selecting a collaborator from said at least one consultant based on at least one selection criterion.

A selection criterion is selected from a group of criteria including: greatest coincidence of interest; priority element; greatest number of elements; absence of elements indicating a lack of common interest; distance between shopper and consultant: communication link between said shopper and consultant: language common to shopper and consultant: prior experience with a given consultant, cost of consulting services; and any combination of these and similar criteria.

In some embodiments of the method, at least one consultant is a human expert; and/or the step of forming an estimate of a shopping interest of a shopper comprises at least one of: determining contents of the shopper's shopping cart; employing a geographic location of the shopper to determine products, services and information to which shopper is currently proximate; retrieving shopping history of the shopper, and forming an intersection of shopping interest to form a list of products, services and information for which the shopper has indicated interest; and/or the step of estimating a consulting interest of at least one consultant includes at least one of: determining contents of the consultant's shopping cart, employing the geographic location of the consultant to determine products, services and information to which consultant is currently proximate, retrieving shopping history of the consultant, retrieving a database of consultant's knowledge, and includes the step of forming an intersection of shopping interest to form a list of products, services and information for which consultant has interest.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

Thus, the invention includes an article of manufacture comprising a computer usable medium having computer readable program code means embodied therein for causing location of a collaborator, the computer readable program code means in said article of manufacture comprising computer readable program code means for causing a computer to effect the step of locating a collaborator based on an automatic determination of likely coincidence of shopping interests, the step of locating comprising: forming an estimate of a shopping interest of a shopper; estimating a consulting interest of at least one consultant; finding at least one common element between the shopping interest of the shopper and the consulting interest of said at least one consultant, said at least one common element forming a coincidence of interest; and selecting said collaborator from said at least one consultant based on at least one collaborator selection criterion.

The invention includes a program storage device readable by machine, tangibly embodying a program of instructions executable by the machine to perform method steps for facilitating collaboration. It also includes a program storage device readable by machine, tangibly embodying a program of instructions executable by the machine to perform method steps for locating a collaborator.

Thus, the invention includes a shopping apparatus comprising means for enabling establishment of collaboration between a shopper and at least one consultant, the means for enabling comprising: means for automatically determining a shopping interest of the shopper; means for automatically determining a likelihood that a specific consultant can and will provide relevant information; means for ranking each of said at least one consultant based on the likelihood of receiving advice helpful to said shopper from that consultant; means for the shopper selecting at least one consultant from said at least one consultant; and means for establishing communication between the shopper and said at least one consultant for soliciting and obtaining said advice. In some embodiments the apparatus further comprises means for evaluating advice received from a given consultant; and means for storing said advice.

The invention includes an apparatus for characterization of areas of consultant expertise of consultants, the apparatus comprising: means for obtaining information on how recently a consultant purchased products of a given category, and how often the consultant purchased the products, means for determining whether consultant advice given has been found by shoppers to be relevant and helpful in the past; means for determining a willingness and capability of each consultant to give advice, based on physical proximity, current workload and explicitly stated desire; and means for assigning a score to each consultant based on the information, willingness and capability. In some embodiments, the apparatus further comprises means for analyzing the information to determine whether necessary and sufficient conditions for a successful consultancy are met.

The invention includes a method for locating a shopping collaborator for a shopper. The step of locating the shopping collaborator is based on an automatic determination of likely coincidence of shopping interests of said shopper and said shopping collaborator, the step of locating comprising: forming an estimate of a shopping interest of a shopper; determining a consulting interest of at least one consultant; finding at least one common element between the shopping interest of the shopper and the consulting interest of said at least one consultant, said at least one common element forming a coincidence of interest; and selecting said collaborator from said at least one consultant based on at least one collaborator selection criterion.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. Ai apparatus for characterization of areas of consultant expertise, said
apparatus comprising:
A) a processor device executing machine-executable instructions;
B) a program storage device operably coupled with the processor device and comprising the machine-executable instructions for:
automatically determining shopping goals of a shopper, without said shopper having to explicitly supply the shopping goals as input, by:
analyzing contents of the shopper's shopping cart; and
performing a location operation to determine the shopper's location in the store;
wherein said shopping goals comprise a first list of candidate products that the shopper desires to acquire in a store;
listing the contents of the shopper's shopping cart in a second list;
for each candidate product in the first list of candidate products, automatically:
querying a database comprising a third list of potential shopping collaborators correlated to the candidate product for which the potential shopping collaborators have experience and knowledge;
retrieving from the database the third list of the potential shopping collaborators with experience and knowledge of the candidate product;
determining which of the potential shopping collaborators are currently online, therefore available; and
ranking the available shopping collaborators by assigning a high ranking to those collaborators with attributes of:
close physical proximity between the shopper and the collaborators;
a positive rating of the shopper's past experience with the collaborators as stored in the database;
experience in multiple product sets associated with the candidate product;
recent purchase of the candidate product; and
frequent purchases of the candidate product;
merging the third lists of ranked, available shopping collaborators for each candidate product into a final list to eliminate duplicates of shopping collaborators relevant to more than one candidate product;

and transmitting to a user interface associated with the shopper the final list of ranked available shopping collaborators; and C) the user interface for:

presenting the final list of ranked available shopping collaborators to the shopper;

and receiving a rating of the shopper's interaction with the shopping collaborators.

2. The apparatus of claim 1 wherein the candidate product comprises a service.

3. The apparatus of claim 1, wherein the candidate product comprises information.

4. A computer program product for characterization of areas of consultant expertise, the computer program product comprising a non-transitory computer readable storage medium having computer readable program code embodied therewith, the computer readable program code comprising instructions for:

automatically determining shopping goals of a shopper, without said shopper having to explicitly supply the goals as input by:

analyzing contents of the shopper's shopping cart; and performing a location operation to determine the shopper's location in the store;

wherein said shopping goals comprise a first list of candidate products that the shopper desires to acquire in a store;

listing the contents of the shopper's shopping cart in a second list;

for each candidate product in the first list of candidate products, automatically:

querying a database comprising a third list of potential shopping collaborators correlated to the candidate products for which the potential shopping collaborators have experience and knowledge;

retrieving from the database the third list of the potential shopping collaborators with experience and knowledge of the candidate product;

determining which of the potential shopping collaborators are currently online, therefore available; and ranking the available shopping collaborators by assigning a high ranking to those collaborators with attributes of:

close physical proximity between the shopper and the collaborators;

a positive rating of the shopper's past experience with the collaborators as stored in the database;

experience in multiple product sets associated with the candidate product;

recent purchase of the candidate product; and frequent purchases of the candidate product;

merging the third list of the ranked available shopping collaborators for each candidate product into a final list to eliminate duplicates of collaborators relevant to more than one candidate product;

transmitting to a user interface associated with the shopper the final list of ranked available shopping collaborators for displaying to the shopper;

and receiving a rating of the shopper's interaction with the shopping collaborators.

5. The computer program product of claim 4, wherein the candidate product comprises a service.

6. The computer program product of claim 4 wherein the candidate product comprises information.

7. The computer program product of claim 4 wherein the store is an online store and the shopping cart is a virtual shopping cart.

8. The computer program product of claim 4 wherein the shopper's location is correlated with a map of the store to identify a category of products to which the shopper is currently proximate.

9. The computer program product of claim 8, wherein the store is an on-line store and the shopper's location is a logical position of a web page that is a current object of the shopper's attention in a site map.

10. The computer program product of claim 8 wherein the contents of the shopper's shopping cart are compared with the category of products to which the shopper is currently proximate to determine a characterization of the shopper's goal.

11. The computer program product of claim 10 wherein determining a characterization further comprises determining a length of time the shopper has been proximate to a product category.

12. The computer program product of claim 7 wherein determining the shopper's goals comprise determining that the shopper has explicitly asked for help in making a product choice.

13. The computer program product of claim 4 wherein the store is an online store and the shopping cart is a virtual shopping cart.

14. The computer program product of claim 13 wherein the shopper's location is a logical position of a web page in a site map that is a current object of the shopper's attention.

15. The computer program product of claim 14 wherein contents of the shopper's shopping cart are compared with the category of products to which the shopper is currently proximate to determine a characterization of the shopper's goal.

* * * * *